UNITED STATES PATENT OFFICE.

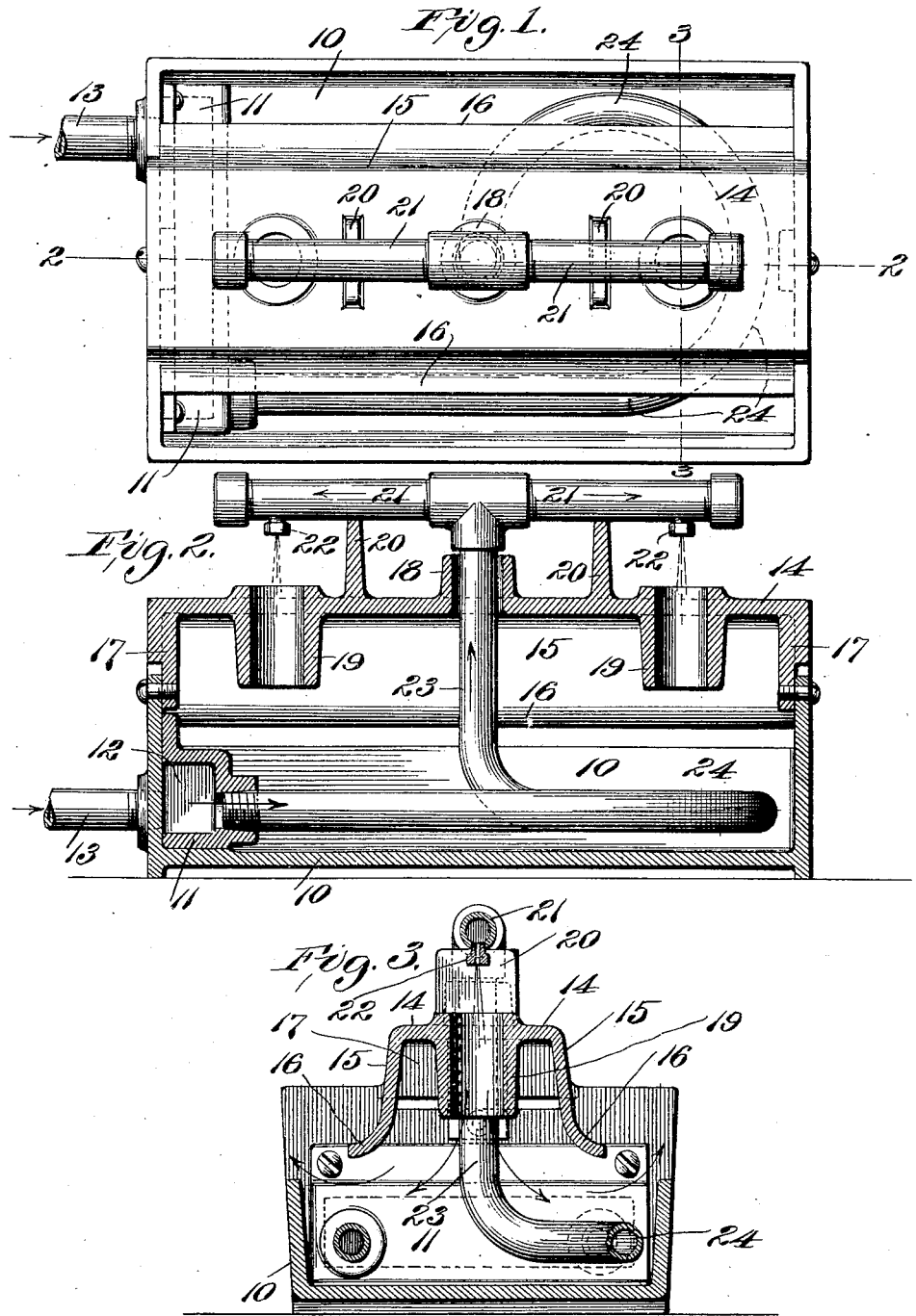

ROBERT G. SPEER, OF ST. LOUIS, MISSOURI.

HYDROCARBON-BURNER.

1,119,052.  Specification of Letters Patent.  Patented Dec. 1, 1914.

Application filed February 7, 1914. Serial No. 817,172.

*To all whom it may concern:*

Be it known that I, ROBERT G. SPEER, a citizen of the United States, residing at St. Louis, Missouri, have invented certain new and useful Improvements in Hydrocarbon Burners, of which the following is a full, clear, and exact description, reference being had to the accompanying drawings, forming a part hereof.

My invention relates to new and useful improvements in hydro-carbon burners, the principal object of my invention being to provide a comparatively simple, inexpensive device in which liquid hydro-carbon can be burned to produce, without smoke and odor, a comparatively high degree of heat, said device being particularly intended for use for cooking and heating purposes.

With the above and other objects in view, my invention consists in certain novel features of construction and arrangement of parts hereinafter more fully described and claimed.

Figure 1 is a plan view of a burner of my improved construction. Fig. 2 is a vertical section taken approximately on the line 2—2 of Fig. 1. Fig. 3 is a cross space section taken approximately on the line 3—3 of Fig. 1.

Referring by numerals to the accompanying drawings, 10 designates the base of my improved burner, which is in the form of an open top box, the end walls of which are slightly higher than the side walls, and located in one end of this box-like base is a hollow casing 11, which provides an expansion chamber 12, the same extending entirely across the base. Leading into one end of this chamber is the liquid hydro-carbon supply pipe 13, the same being connected to a suitable gravity or pressure supply tank. The upper portion of the burner comprises a plate 14, which is substantially narrower in width than the base 10, and extending downwardly from the sides of said plate 14 are longitudinally disposed walls 15, the lower ends of which are curved outward as designated by 16. The lower ends of these walls 15 terminate above and inside the upper edges of the side walls of the base 10.

Formed integral with the ends of the plate 14 are end walls 17 which are fixed in any suitable manner to the upper ends of the end walls of the base 10. Formed integral with the center of the plate 14 is an upwardly projecting tubular lug 18, and formed integral with said plate near its ends are downwardly projecting tubular lugs 19. Formed integral with the plate 14 adjacent to the lugs 19 are upwardly projecting brackets 20, upon which rests a horizontally disposed tube 21, the ends of which are closed in any suitable manner preferably by means of caps. Tapped into the underside of this tube 21 immediately above the central portions of the tubular lugs 19 are jet nozzles 22. Connected to and leading downward from the central portion of tube 21 through the tubular lug 18 is a tube 23, the same being bent to form a coil 24 in the lower portion of the base 10 and the opposite end of this tube is tapped into the housing 11 at the opposite end of the chamber 12 from the supply pipe 13.

To start my improved burner, a small amount of liquid hydro-carbon is placed in the box-like base 10, and upon ignition, the tube 23, housing 11, and the upper portion of the burner become heated. Liquid hydro-carbon enters the expansion chamber 12 through pipe 13, and the greater portion of this liquid hydrocarbon is vaporized within the chamber 12. This vapor, together with a small percentage of the liquid hydro-carbon passes through tube 23, in which all of the hydro-carbon is vaporized and the resulting vapor passes into tube 21, and discharges from thence through the jet nozzles 22 downward through the tubular lugs 19. This action draws air downward through said tubular lugs, which air is mixed with the vaporized hydro-carbon and the resulting mixture discharges beneath the curved lower edges of walls 15 and upon being ignited this vapor burns with a high degree of heat and without odor. During the continued operation of the burner, the combustion of the vaporized liquid hydro-carbon maintains the burner in a heated condition, so that the supply of liquid hydro-carbon delivered to the expansion chamber 12 is all vaporized therein. The expansion chamber 12 permits the liquid hydro-carbon to expand as it is vaporized, and thus the flow of vapor or gas from the jet nozzles 22 is even and without pulsations.

A burner of my improved construction is particularly designed to use kerosene or coal-oil, as fuel, although any form of liquid hydro-carbon can be advantageously and economically burned in the device.

It will be readily understood that minor changes in the size, form and construction of the various parts of my improved burner may be made and substituted for those herein shown and described, without departing from the spirit of my invention, the scope of which is set forth in the appended claim.

I claim:

In a burner of the class described, a base provided in one end with an expansion chamber, a plate fixed to said base and provided on its side with depending walls, the lower portions of which are curved outwardly and terminate above and inside the side walls of the base, said plate being provided with a pair of openings, perforated lugs integral with said plate, and which lugs depend from said plate around the openings therein, a burner tube positioned above said plate, jet nozzles seated in the underside of said burner, tube directly above the openings in the plate, a pipe leading from the expansion chamber to the burner tube, and means for delivering hydro-carbon to the expansion chamber.

In testimony whereof I hereunto affix my signature in the presence of two witnesses, this 4th day of February, 1914.

ROBERT G. SPEER.

Witnesses:
ALLEN B. LEWIS,
C. C. DE WITT.

Copies of this patent may be obtained for five cents each, by addressing the "Commissioner of Patents, Washington, D. C."